United States Patent
Chen et al.

(10) Patent No.: US 6,863,716 B2
(45) Date of Patent: Mar. 8, 2005

(54) TRAP-TYPE AIR PURIFICATION SYSTEM

(75) Inventors: Yung-Dar Chen, Hsien (TW); Po-Sung Kuo, Tainan (TW); Yen-Chun Wang, Taipei Hsien (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 87 days.

(21) Appl. No.: 10/356,415

(22) Filed: Jan. 31, 2003

(65) Prior Publication Data

US 2004/0149134 A1 Aug. 5, 2004

(51) Int. Cl.[7] .............................................. B01D 47/06
(52) U.S. Cl. ........................... 96/297; 95/214; 95/224; 96/361; 96/363; 96/364
(58) Field of Search ......................... 95/211, 214, 224, 95/225; 96/296, 297, 355, 361, 363, 364

(56) References Cited

U.S. PATENT DOCUMENTS

| | | | | |
|---|---|---|---|---|
| 1,117,309 A | * | 11/1914 | Bentz | 96/273 |
| 1,134,976 A | * | 4/1915 | Braemer et al. | 96/251 |
| 1,222,541 A | * | 4/1917 | Donham | 95/224 |
| 1,813,692 A | * | 7/1931 | Anderson | 96/364 |
| 2,057,579 A | * | 10/1936 | Kurth | 96/233 |
| 2,110,203 A | * | 3/1938 | Crawford | 95/10 |
| 2,197,004 A | * | 4/1940 | Myers | 96/365 |
| 2,513,174 A | * | 6/1950 | Hess | 95/214 |
| 3,036,417 A | * | 5/1962 | Mare et al. | 95/213 |
| 3,785,127 A | * | 1/1974 | Mare | 96/297 |
| 3,795,089 A | * | 3/1974 | Reither | 96/262 |
| 4,397,662 A | * | 8/1983 | Bloomer | 96/239 |
| 4,544,380 A | * | 10/1985 | Itou et al. | 95/210 |
| 4,604,108 A | * | 8/1986 | Cotton, Jr. | 95/16 |
| 4,684,379 A | * | 8/1987 | Gambrell | 96/262 |
| 4,784,835 A | * | 11/1988 | Fritz | 422/170 |
| 4,926,620 A | * | 5/1990 | Donle | 95/202 |
| 6,059,866 A | * | 5/2000 | Yamagata et al. | 96/251 |
| 6,451,096 B1 | * | 9/2002 | Kim | 96/270 |
| 6,497,757 B2 | * | 12/2002 | Wakamatsu et al. | 96/290 |
| 6,562,304 B1 | * | 5/2003 | Mizrahi | 422/171 |
| 6,645,273 B2 | * | 11/2003 | Wakamatsu et al. | 95/199 |
| 6,743,279 B2 | * | 6/2004 | Cataldo | 95/228 |
| 2002/0110511 A1 | * | 8/2002 | Klingspor et al. | 423/243.08 |
| 2003/0089242 A1 | * | 5/2003 | Wakamatsu et al. | 96/290 |

* cited by examiner

Primary Examiner—Duane S. Smith
(74) Attorney, Agent, or Firm—Tung & Associates

(57) ABSTRACT

An air purification system which is well-suited to removing particles from outside air as the air flows into a cleanroom used in the fabrication of semiconductor integrated circuits. A housing provides at least one spray nozzle for spraying fine mist water droplets. In use, the water droplets capture the airborne particles in the air flowing through the housing and adhere to the water droplet target. The water droplets coalesce and form larger droplets which adhere to the surface of the water droplet target and ultimately collect in a drain pan. The low-density water droplet target prevents large pressure differentials from forming in the housing, which pressure differentials may otherwise cause re-vaporization of the water droplets from the target and re-flow of the particles in the flowing air.

14 Claims, 2 Drawing Sheets

TRAP-TYPE AIR PURIFICATION SYSTEM

FIELD OF THE INVENTION

Figure 1:
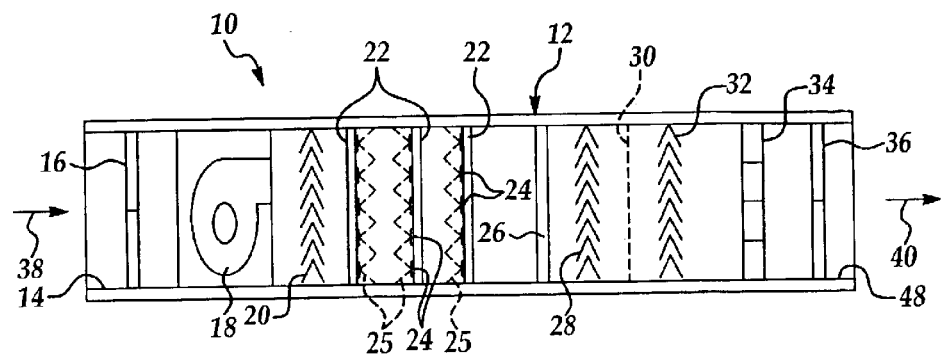

The present invention relates to systems used to clean outside air for subsequent distribution of the air throughout manufacturing clean rooms. More particularly, the present invention relates to an air purification system which utilizes at least one water droplet trap for trapping particle-laden mist droplets removed from outside air prior to introducing the air into a cleanroom manufacturing facility.

BACKGROUND OF THE INVENTION

Generally, the process for manufacturing integrated circuits on a silicon wafer substrate typically involves deposition of a thin dielectric or conductive film on the wafer using oxidation or any of a variety of chemical vapor deposition processes; formation of a circuit pattern on a layer of photoresist material by photolithography; placing a photoresist mask layer corresponding to the circuit pattern on the wafer; etching of the circuit pattern in the conductive layer on the wafer; and stripping of the photoresist mask layer from the wafer. Each of these steps, particularly the photoresist stripping step, provides abundant opportunity for organic, metal and other potential circuit-contaminating particles to accumulate on the wafer surface.

In the semiconductor fabrication industry, minimization of particle contamination on semiconductor wafers increases in importance as the integrated circuit devices on the wafers decrease in size. With the reduced size of the devices, a contaminant having a particular size occupies a relatively larger percentage of the available space for circuit elements on the wafer as compared to wafers containing the larger devices of the past. Moreover, the presence of particles in the integrated circuits compromises the functional integrity of the devices in the finished electronic product. To achieve an ultraclean wafer surface, particles must be removed from the wafer, and particle-removing methods are therefore of utmost importance in the fabrication of semiconductors.

Because minimization of particles on wafers throughout the IC manufacturing process is critical, the environment within which the IC manufacturing process is carried out must be subjected to stringent controls on the presence of airborne particles which would otherwise enter the manufacturing environment from outside the facility. Currently, mini-environment based IC manufacturing facilities are equipped to control airborne particles much smaller than 1.0 $\mu$m. Accordingly, modern semiconductor manufacturing is carried out in a complex facility known as a cleanroom. The cleanroom is isolated from the outside environment and subjected to stringent controls on contaminants including airborne particles, metals, organic molecules and electrostatic discharges (ESDs), as well as on such environmental parameters as temperature, relative humidity, oxygen and vibration. Along with a sophisticated system of filters and equipment, a comprehensive and strictly-enforced set of procedures and practices are imposed on facility personnel in order to maintain a delicate balance of these clean air requirements and parameters for optimal IC fabrication.

Modern cleanrooms used in the fabrication of integrated circuits typically include one large fabrication room having a service access corridor that extends around the perimeter of the cleanroom and a main manufacturing access corridor that extends across the center of the cleanroom. Production bays, which accommodate the semiconductor fabrication tools, are located on respective sides of the main manufacturing access corridor. Outside air enters the cleanroom through an air purification system which is typically located above the ceiling of the cleanroom and includes particulate filters, typically HEPA (high-efficiency particulate air) filters. Through openings in the ceiling, the air is drawn downwardly in a continuous laminar flow path from the air purification system, through the cleanroom and into a recirculation air system through openings in the floor. The recirculation air system may turn the air over every six seconds in order to achieve ultraclean conditions during disturbances such as changes in personnel shifts. An exhaust system removes heat and chemicals generated during the fabrication processes.

Figure 2:
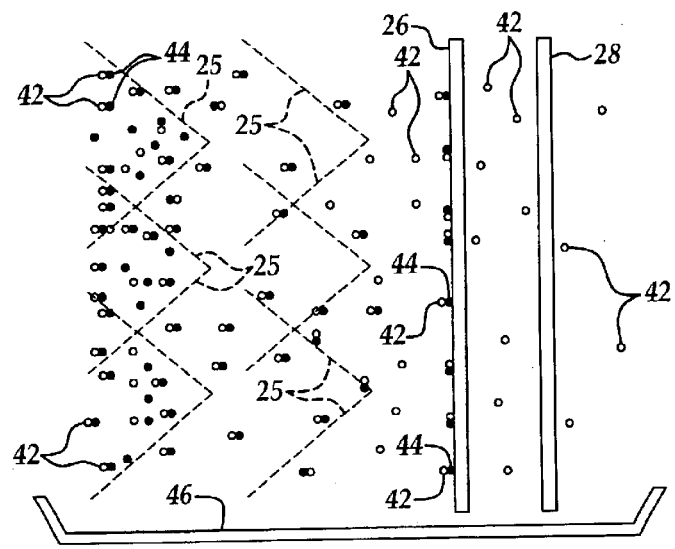
Figure 3:
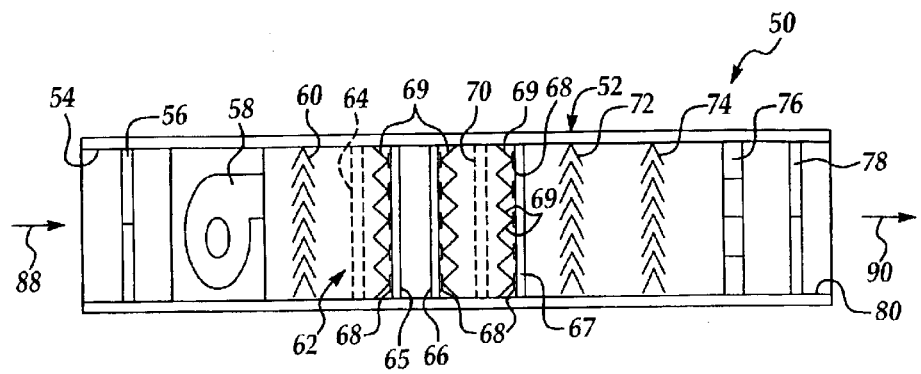

FIG. 1 illustrates an example of a conventional air purification system 10 used to purify outside air 38 as the air 38 is drawn through the system 10 and into a semiconductor fabrication facility cleanroom (not shown). The air purification system 10 includes an elongated housing 12 having an intake end 14. A blower 18 draws the outside air 38 into the intake end 14 and then initially through a pre-filter 16 in the housing 12, which pre-filter 16 removes particles larger than a selected size from the air 38. The air then flows through an upstream cooling coil 20, which cools the air to a temperature at or below the dew point in such a manner that moisture in the air coalesces into water droplets 44, as shown in FIG. 2. Multiple nozzle conduits 22, each provided with multiple spray nozzles 24, are typically provided in the housing 12 and each forms a water spray 25 that generates a fine mist of additional water droplets 44. The water droplets 44 bind to the airborne particles 42 and carry the particles 42 to a high density eliminator 26, which is typically constructed of high-density paper or non-woven cloth. A downstream cooling coil 28 is provided on the opposite side of the high density eliminator 26. As shown in FIG. 2, many of the particles 42, bound to the water droplets 44, accumulate on the high density eliminator 26. Most of the droplet-bound particles 42 are eventually pulled by gravity down the high density eliminator 26 and are collected in a collection pan 46 at the bottom of the housing 12. The air, from which most of the airborne particles 42 have been removed, next flows typically through a low density eliminator 30 which is typically constructed of a low-density fabric curtain material, and then, through a heating coil 32 which heats the air typically to room temperature. Before exiting the outlet end 48 of the housing 12, the air is passed through a chemical filter 34, which removes chemical residues from the air, and finally, through a HEPA filter 36. The HEPA filter 36 is a high-efficiency filter which removes about 99.97% of the airborne particles from the air flowing therethrough. Finally, the purified air 40 emerges from the outlet end 48 of the housing 12 and enters the cleanroom (not shown) of the facility through a suitable air distribution system (not shown).

The presence of the high-density eliminator 26 inside the housing 12 induces a substantially high pressure differential in the housing 12 on respective sides of the high density eliminator 26, with the air pressure downstream of the high density eliminator 26 substantially lower than the air pressure upstream of the high density eliminator 26. This reduction in air pressure causes re-vaporization of some of the water droplets 44 at the downstream surface of the high density eliminator 26 which faces the downstream cooling coil 28. As shown in FIG. 2, re-vaporization of the water droplets 44, in turn, causes the particles 42 on the downstream surface of the high density eliminator 26 to again become airborne as the air continuously flows through the high density eliminator 26 toward the outlet end 48 of the housing 12. The smaller the quantity of water droplets 44 generated by the water sprays 25, the more readily the water droplets 44 re-vaporize at the downstream surface of the high density eliminator 26. Consequently, a large quantity of water must be used to sustain the water sprays 25 in order to form a saturation environment sufficient to prevent or substantially reduce re-vaporization of the water droplets 44 from the high density eliminator 26 and thus, reduce the quantity of particles 42 that become airborne at the downstream surface of the high density eliminator 26. Accordingly, a new and improved air purification system is needed for preventing or minimizing re-vaporization of water droplets after the water droplets capture airborne particles and adhere to a surface inside the system.

An object of the present invention is to provide a new and improved purification system for removing particles from a flowing gas.

Figure 4:
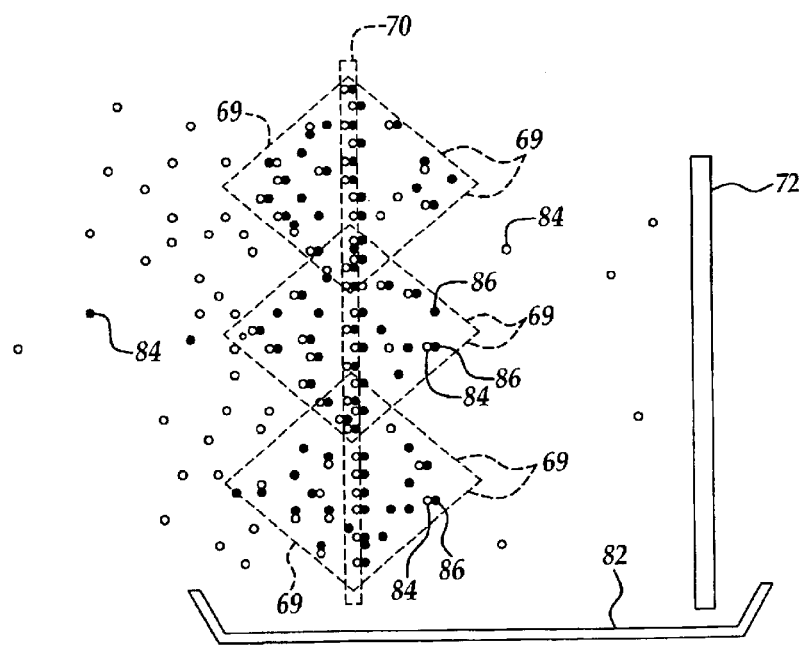

Another object of the present invention is to provide a new and improved air purification system which is suitable for purifying outside air and introducing the air into a cleanroom for the manufacture of semiconductor integrated circuits.

Still another object of the present invention is to provide an air purification system which utilizes a water droplet trap for the adhesion of water droplets after the droplets capture airborne particles from a flowing airstream.

Yet another object of the present invention is to provide an air purification system which is efficient and reduces the quantity of water required to remove particles from a stream of flowing air.

A still further object of the present invention is to provide an air purification system which utilizes multiple spray nozzles which spray fine mist water droplets that capture airborne particles and a low density water trap to which the water droplets with captured particles adhere for eventual removal.

SUMMARY OF THE INVENTION

In accordance with these and other objects and advantages, the present invention is generally directed to a new and improved air purification system which is particularly well-suited to removing particles from outside air as the air flows into a cleanroom typically used in the fabrication of semiconductor integrated circuits. The invention includes a housing that contains at least one spray nozzle for spraying fine mist water droplets. At least one water droplet target is provided adjacent to the spray nozzle or nozzles. In use, the water droplets capture the airborne particles in the air flowing through the housing and adhere to the water droplet target. The water droplets coalesce and form larger droplets which are pulled by gravity down the adhesion surface of the water droplet target and are ultimately collected in a drain pan. The low-density water droplet target prevents large pressure differentials from forming in the housing, which pressure differentials may otherwise cause re-vaporization of the water droplets from the target and re-flow of the particles in the flowing air.

BRIEF DESCRIPTION OF THE DRAWINGS

The invention will now be described, by way of example, with reference to the accompanying drawings, in which:

FIG. 1 is a longitudinal sectional schematic view of a typical conventional air purification system for semiconductor fab cleanrooms;

FIG. 2 is a sectional schematic view illustrating removal of particles from air flowing through the system of FIG. 1;

FIG. 3 is a longitudinal sectional schematic view of an air purification system of the present invention; and FIG. 4 is a sectional schematic view illustrating removal of particles from air flowing through the system of the present invention, utilizing a low-density water droplet target.

DESCRIPTION OF THE PREFERRED EMBODIMENTS

The present invention has particularly beneficial utility in the removal of particles from air prior to introduction of the air into a cleanroom used in the fabrication of semiconductor integrated circuits on wafer substrates. However, the invention is not so limited in application and is more generally applicable to the removal of particles from gases or air in a variety of industrial and mechanical applications.

Referring to FIG. 3, an illustrative embodiment of the air purification system 50 of the present invention includes an elongated housing 52, having an intake end 54 and an outlet end 80. A pre-filter 56 is typically provided in the housing 52 adjacent to the intake end 54, and a blower 58 is provided downstream of the pre-filter 56. An upstream cooling coil 60 and a downstream cooling coil 72 are provided in the housing 52, downstream of the blower 58.

In accordance with the present invention, a particle removing system 62 is provided in the housing 52 between the upstream cooling coil 60 and the downstream cooling coil 72. The particle removing system 62 includes an upstream water droplet trap 64 which is provided downstream of the upstream cooling coil 60 and substantially spans the interior of the housing 52. The water droplet trap 64 is typically a very low density eliminator which is constructed of a paper or fabric material such as a non-woven sheet. The water droplet trap 64 has a porosity of about 3%. The term "porosity" is defined as "the ration of the volume of the pores of a substrate to the total volume of the mass". An upstream nozzle conduit 65, located downstream of the upstream water droplet trap 64, includes multiple spray nozzles 68 which are directed toward the upstream water droplet trap 64. A middle nozzle conduit 66 and a downstream nozzle conduit 67, each provided with multiple spray nozzles 68, are typically provided in the housing 52 downstream of the upstream nozzle conduit 65. A downstream water droplet trap 70, which is typically a very low density eliminator having the same construction and density as that of the upstream water droplet trap 64, is provided between the middle nozzle conduit 66 and the downstream nozzle conduit 67. The spray nozzles 68 of both the middle nozzle conduit 66 and the downstream nozzle conduit 67 are directed toward the downstream water droplet trap 70. The downstream cooling coil 72 is positioned downstream of the downstream nozzle conduit 67. A chemical filter 76 and a HEPA filter 78 are provided in the housing 52, downstream of the heating coil 74.

Referring next to FIGS. 3 and 4, in operation of the air purification system 50 of the present invention, outside air 88 is drawn through the intake end 54 of the housing 52 into the system 50, which purifies the outside air 88 in the manner hereinafter described and discharges the purified air 90 through the outlet end 80 of the housing 52. The purified air 90 is typically introduced into a cleanroom (not shown), such as that of a semiconductor manufacturing facility, for example. Accordingly, the blower 58 initially draws the outside air 88 into the housing 52 through the intake end 54, after which the air 88 flows initially through the pre-filter 56 and then through the upstream cooling coil 60. The pre-filter 56 removes particles larger than a selected size from the air 88, in conventional fashion. As it passes through the upstream cooling coil 60, the air is cooled to a temperature at or below the dew point (9° C.). Simultaneously, the multiple spray nozzles 68 of the upstream nozzle conduit 65 each forms a diverging water spray 69 that generates a fine mist of water spray droplets 86, as shown in FIG. 4. In similar fashion, each of the spray nozzles 68 of the middle nozzle conduit 66 and of the downstream nozzle conduit 67, respectively, forms a diverging water spray 69 that generates a fine mist of the water spray droplets 86. These water spray droplets 86 bind to airborne particles 84 in the flowing air 88. Because the spray nozzles 68 of the upstream nozzle conduit 65 are directed toward the upstream water droplet trap 64, and the spray nozzles 68 of both the middle nozzle conduit 66 and the downstream nozzle conduit 67 are directed toward the downstream water droplet trap 70, the force of the respective water sprays 69 directs the particle-bound water spray droplets 86 toward the upstream water droplet trap 64 and the downstream water droplet trap 70, respectively. Consequently, the particle-bound water spray droplets 86 tend to accumulate on the respective water droplet traps 64, 70. As the water spray droplets 86 accumulate on the water droplet traps 64, 70 and merge with each other to form water droplets of ever-increasing size, the particles 84 are carried with the water droplets down the respective water droplet traps 64, 70 and are collected in a drain pan 82 at the bottom of the housing 52. The drain pan 82 is periodically emptied to remove the collected particles 42 therefrom.

It will be appreciated by those skilled in the art that the low density construction of the upstream water droplet trap 64 and of the downstream water droplet trap 70 facilitates ease in passage of the air 88 through the particle removing system 62. This reduces the pressure drop between the upstream and downstream surfaces of the upstream water droplet trap 64 and between the upstream and downstream surfaces of the downstream water droplet trap 70. Consequently, the tendency for the water droplets 86 which bind and carry the airborne particles 84 to re-vaporize and release the particles 84 from the traps 64, 70, at the downstream surfaces thereof, is eliminated or substantially reduced.

Having passed through the upstream water droplet trap 64 and the downstream water droplet trap 70 of the particle removing system 62, the air 88 is devoid of all or a substantially large quantity of the airborne particles 84 that were present therein upon entry of the air 88 into the intake end 54 of the housing 52. The air 88 next flows typically through the heating coil 74, which raises the temperature of the air 88 to typically about room temperature. Before exiting the outlet end 80 of the housing 52, the air 88 passes through the chemical filter 76, which removes any chemical residues remaining in the air 88, and finally, through the HEPA filter 78, which removes any remaining particles larger than a selected size from the air 88. Accordingly, the air emerges from the outlet end 80 of the housing 52 as purified air 90 which meets or exceeds the cleanroom standards for air purity.

While the preferred embodiments of the invention have been described above, it will be recognized and understood that various modifications can be made in the invention and the appended claims are intended to cover all such modifications which may fall within the spirit and scope of the invention.

What is claimed is:

1. An air purification system comprising:
   a housing for receiving a stream of air;
   an upstream water droplet trap and a downstream water droplet trap provided in said housing;
   at least one upstream spray nozzle provided in said housing adjacent to said upstream water droplet trap for forming a water spray against said upstream water droplet trap; and
   at least one downstream spray nozzle provided in said housing adjacent to said downstream water droplet trap for forming a water spray against said downstream water droplet trap.

2. The system of claim 1 wherein said at least one water droplet trap has a porosity of about 3%.

3. The system of claim 1 further comprising at least one pre-filter provided in said housing upstream of said at least one water droplet trap.

4. The system of claim 3, wherein said at least one water droplet trap has a porosity of about 3%.

5. The system of claim 1 further comprising a chemical filter and a HEPA filter provided in said housing downstream of said at least one water droplet trap.

6. The system of claim 5, wherein said at least one water droplet trap has a porosity of about 3%.

7. The system of claim 5, further comprising at least one pre-filter provided in said housing upstream of said at least one water droplet trap.

8. An air purification system comprising:
   a housing for receiving a stream of air;
   an upstream water droplet trap and a downstream water droplet trap provided in said housing;
   at least one upstream spray nozzle provided in said housing adjacent to said upstream water droplet trap for forming a water spray against said upstream water droplet trap;
   at least one downstream spray nozzle provided in said housing adjacent to said downstream water droplet trap for forming a water spray against said downstream water droplet trap; and
   an upstream cooling coil provided in said housing upstream of said at least one upstream spray nozzle.

9. The system of claim 8 wherein said at least one water droplet trap has a porosity of about 3%.

10. The system of claim 8 further comprising at least one pre-filter provided in said housing upstream of said upstream cooling coil.

11. The system of claim 8 further comprising a chemical filter and a HEPA filter provided in said housing downstream of said downstream water droplet trap.

12. An air purification system comprising:
    a housing for receiving a stream of air;
    an upstream water droplet trap and a downstream water droplet trap provided in said housing;
    an upstream cooling coil provided in said housing upstream of said upstream water droplet trap;
    a downstream cooling coil provided in said housing downstream of said downstream water droplet trap;
    a first set of spray nozzles provided in said housing adjacent to said upstream water droplet trap for forming a first set of water sprays against said upstream water droplet trap; and
    a second set of spray nozzles and a third set of spray nozzles for forming a second set and a third set, respectively, of water sprays against said downstream water droplet trap.

13. The system of claim 12 wherein said upstream water droplet trap and said downstream water droplet trap each has a porosity of about 3%.

14. The system of claim 12 further comprising at least one pre-filter provided in said housing upstream of said upstream cooling coil and a chemical filter and a HEPA filter provided in said housing downstream of said downstream cooling coil.

* * * * *